United States Patent

Morris

[11] Patent Number: 6,088,036
[45] Date of Patent: Jul. 11, 2000

[54] METHOD OF GENERATING AN IMAGE

[75] Inventor: Jeremy S. Morris, Reigate, United Kingdom

[73] Assignee: U.S. Philips Corporation, New York, N.Y.

[21] Appl. No.: 08/170,651

[22] Filed: Dec. 20, 1993

Related U.S. Application Data

[63] Continuation of application No. 07/724,555, Jun. 28, 1991, abandoned.

[30]     Foreign Application Priority Data

Jun. 29, 1990 [GB] United Kingdom .................. 9014528

[51] Int. Cl.$^7$ ...................................................... G06T 17/00
[52] U.S. Cl. .......................... 345/428; 345/430; 348/399; 348/424; 348/425
[58] Field of Search .................................... 395/118, 119, 395/120, 123, 130, 131, 141; 345/428, 430; 348/399, 424, 425

[56]            References Cited

U.S. PATENT DOCUMENTS

| | | | |
|---|---|---|---|
| 4,343,037 | 8/1982 | Bolton | 395/130 |
| 4,615,013 | 9/1986 | Yan et al. | 395/130 |
| 4,782,387 | 11/1988 | Sabri | 358/133 |
| 4,965,667 | 10/1990 | Trew | 358/138 |
| 5,034,814 | 7/1991 | Watson | 358/141 |
| 5,043,810 | 8/1991 | Vreeswijk | 358/133 |

FOREIGN PATENT DOCUMENTS

| | | |
|---|---|---|
| 2226937 | of 0000 | United Kingdom . |
| 2177577A | 1/1987 | United Kingdom ............. G09G 1/16 |
| 8607646 | of 0000 | WIPO . |

OTHER PUBLICATIONS

"Digital Image Processing", 2nd Edition, Rafael C. Gonzalez, 1987, pp. 26–28.

Lester et al, "Computer Graphics on a Hexagonal Grid" Computers and Graphics vol. 8, No. 4, 1984, Oxford GB pp. 401–409.

"Fast Spheres, Shadows, Textures, Transparencies and Image Enhancements in Pixel–Planes"; Fuchs et al; Computer Graphics, vol. 19, No. 3 pp. 111–120.

"A Survey of Texture Mapping"; Heckbert; IEEE Computer Graphics and Applications, Nov. 1986 pp. 56–67.

"A Hidden–Surface Algorithm with Anti–Aliasing"; E. Catmull, Computer Graphics vol. 12, No. 3, pp. 6–11.

"The A–Buffer, An Antialiased Hidden Surface Method", L. Carpenter, Computer Graphics, vol. 18, No. 3, pp. 103–108.

*Primary Examiner*—Ba Huynh

[57]            ABSTRACT

An image of objects in a three dimensional space is generated for display on a two dimensional pixel array in which N renditions of the image are averaged, with each rendition having a sub-pixel offset from the previous rendition, to produce an anti-alias filtering effect. The N sub-pixel offsets are arranged to produce a basic array which ensures N times oversampling of a selected class or classes of image feature. For example, to give good antialias filtering of edges closely aligned with the x-y axes of the pixel array, the offsets are chosen to ensure bisection of the pixel area (A) at N points in each of x and y.

13 Claims, 2 Drawing Sheets

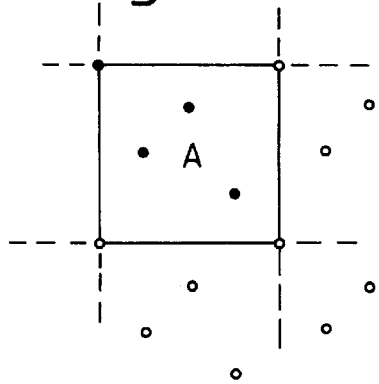
Fig. 3. (N=4)
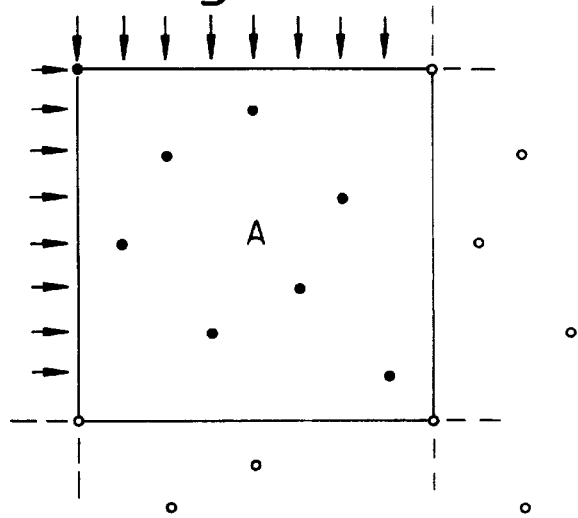
Fig. 4. (N=8)
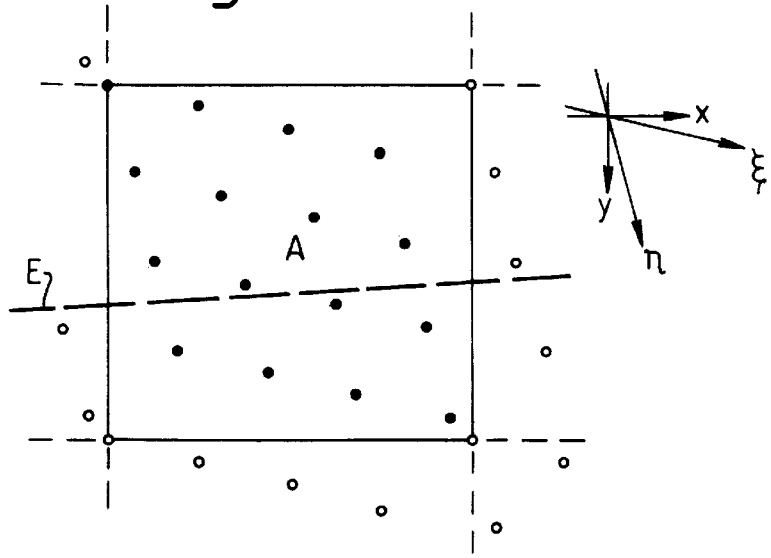
Fig. 5. (N=16)
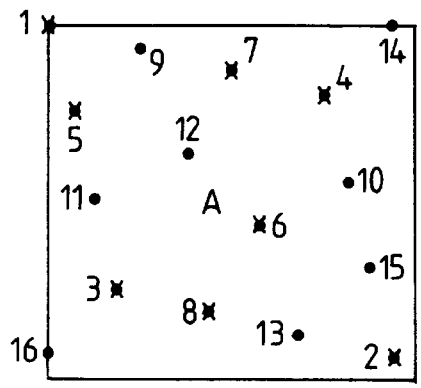
Fig. 6. (N=16)
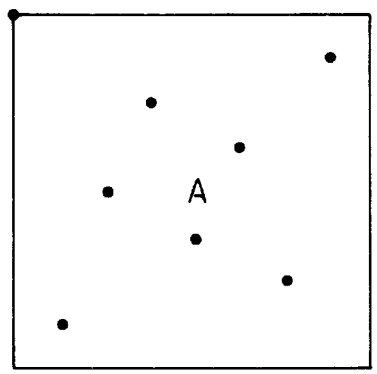
Fig. 7. (N=8)

METHOD OF GENERATING AN IMAGE

This is a continuation of application Ser. No. 07/724,555, filed Jun. 28, 1991 abandoned.

RELATED APPLICATION

This application is related in subject matter to a commonly-owned application, entitled "Generating An Image", inventor—Paul A. Winser, which is filed concurrently with this application. This related application is incorporated herein by reference.

BACKGROUND OF THE INVENTION

The invention relates to a method of generating, from primitive data comprising geometric and surface descriptions of a plurality of image primitives, an image of objects in a three dimensional space in a regular, two-dimensional pixel array having two principal axes, the method comprising:

using the primitive data to render a plurality (N) of point-sampled intermediate pixel arrays while imposing for each rendition a different offset between the primitives and the sample points so as to define a basic array of N sample points distributed substantially over the area of each pixel; and combining the N intermediate pixel arrays to generate a filtered pixel array constituting the desired image.

The invention further relates to an apparatus for generating an image of objects in a three dimensional space in a regular, two-dimensional pixel array, the apparatus comprising:

means for manipulating primitive data comprising geometric and surface descriptions of a plurality of image primitives;

rendering means for using the primitive data to render a plurality (N) of point-sampled pixel arrays while imposing for each rendition a different offset between the primitives and the sample points; and means for combining the N intermediate pixel arrays to generate a filtered pixel array constituting the desired image.

A method and apparatus of the type set forth in the opening two paragraphs are known from "Fast Spheres, shadows, textures, transparencies and image enhancements in pixel-planes" by Henry Fuchs et al in Computer Graphics, Vol. 19, No. 3 (SIGGRAPH '85) at pages 111 to 120, in particular at pages 119 to 120 under "successive refinement". According to Fuchs et al, "Each pixel (x,y) is subdivided into a grid of subpixels so that each subpixel has an address of the form (x+xoffset, y+yoffset). We generate the image several times (16, perhaps), each time offsetting the image slightly by some (xoffset, yoffset) in such a way that the sample points within a pixel's area form a reasonable distribution. (The shift is easily achieved by adding A.xoffset+B.yoffset to the C coefficient of each broadcast triple.) Two sets of color buffers are maintained, one to store the color generated by the latest image generation offset and the other to store a running average as we move around the subpixel grid."

The primary aim of the filtering applied by this method is to reduce aliasing artifacts caused by the sampling process. One obtrusive artifact of aliasing is the "staircase" structure imposed on a primitive edge which slopes relative to the pixel array axes. This effect can become particularly obtrusive for certain classes of image feature, for example primitive edges which are nearly aligned with an axis of the pixel array. Unfortunately, using a basic array in the form of a simple grid, having principal axes aligned with those of the pixel array, leads to a substantial wastage of the filtering potential of N-fold oversampling in the particular case outlined where aliasing is most obtrusive.

This has been recognised in United Kingdom patent application GB-2177577-A, which proposes instead to calculate a random or pseudo-random distribution of sample points (so-called stochastic sampling). This randomisation has the effect of replacing aliasing artifact with noise, on the basis that random noise is in general more acceptable to the human viewer than the regular jagged effects of aliasing. However, the generation of the random sample distributions in GB-2177577-A is complicated by measures taken to avoid bunching and other effects, and optimum antialiasing demands that a new random sample pattern is generated for each pixel. While it is mentioned in GB-2177577-A that, for simplicity, a single randomly generated pattern can be used at every pixel location, there is no guarantee that the filtering of the most obtrusive aliasing artifacts will be better than that afforded by a regular grid of points. Indeed, with a fixed pattern, aliasing might be made even worse by the stochastic technique.

SUMMARY OF THE INVENTION

It is an object of the invention to improve the known method of antialias filtering while avoiding the drawbacks of stochastic sampling.

The invention provides a method as set forth in the opening paragraph, characterized in that the N offsets are determined by:

selecting one or more classes of image feature for filtering; and determining the N offsets of the basic array so as to ensure substantially N times oversampling of the selected class(es) of image feature.

By this method, the invention allows antialias filtering to be implemented at high speed and low cost while ensuring that the N sampling points are fully exploited in the elimination of the most obtrusive aliasing artefacts.

For example, the selected class of image features may comprise edges which are nearly aligned with one or the other axis of the pixel array, the N offsets being chosen so that the pixel area is divided at substantially N places in the direction of one or both of the principal axes.

The basic array of N sample points may for example be a regular two-dimensional array whose principal axes are not aligned with the principal axes of the pixel array. Such an array improves the antialiasing of edges nearly aligned with the pixel array axes. Although aliasing for edges nearly aligned with the sub-pixel array axes or other axes may increase as a result, aliasing of such edges not aligned with axes of the main pixel array is inherently less obtrusive, so that an overall benefit is obtained. Alternatively, the sub-pixel array of sample points may constitute a non-regular two-dimensional array.

The offsets may be chosen so that the sub-pixel array of sample points has a bias toward the periphery of the pixel area. A wide spread of sample points is desirable for edge antialiasing, while a low-density central region in the sub-pixel array only in itself increases vertex aliasing, which is inherently less obtrusive, so that overall benefit may be obtained.

The invention further provides a method as set forth in the opening paragraph, characterized in that different types of surface information are combined in the filtered image by using each type of surface information for a different subset of the renditions. The different types of surface information may for example relate to different primitives, to achieve translucency effects, or they may be from different texture maps, to provide texture blending.

In such an embodiment, each subset of the renditions may be chosen with regard to its own filtering characteristic, in the same manner as the whole basic array of N points.

To avoid excessive switching between the different surface information sources, the renditions may be ordered so as to group together the members of each said subset. Alternatively, the renditions may be ordered so as to disperse and interleave the members of the subsets. The latter alternative may be preferable for example when effecting successive refinements of an image on screen.

The invention further provides a method as set forth in the opening paragraph, characterized in that the primitive data are up-dated between renditions so that the filtered image incorporates motion blurring. Primitives which are moving quickly will thus appear appropriately "smeared out" over a number of pixels, while stationary primitives can benefit from antialiasing provided by the multiple renditions. For this purpose, the sub-pixel array may be defined to optimise the desired filtering as described above. The renditions may also be ordered so that successive sample points are spread widely over the pixel area.

The invention further provides a method as set forth in the opening paragraph wherein the image is part of a motion picture sequence generated in real time, wherein the value of N is chosen adaptively in response to changes in the time required for each rendition, so as to maximise the value of N while maintaining a predetermined minimum image rate. This method allows a system having finite rendering performance to maintain an optimum image quality adapted to scenes of varying complexity. An adaptive choice of N can be used to similar effect in any multiple rendering system, having regular or stochastic sample patterns.

The scene complexity may be determined for example by actual measurment of the time taken by the system to render the first intermediate pixel array, by an estimation based on knowledge of the primitive data, or by a combination of both. The basic array, or even the value of N, may also be varied from pixel to pixel or line to line, to take account of different image features present at different parts of the image.

The invention further provides an apparatus as set forth in the second opening paragraph, characterized in that the N offsets are predetermined in accordance with the invention as set forth above.

BRIEF DESCRIPTION OF THE DRAWING

Embodiments of the invention will now be described, by way of example, with reference to the accompanying drawings, in which:

FIGS. 3 to 7 show various sample point arrays embodying various aspects of the invention.

DETAILED DESCRIPTION OF THE PREFERRED EMBODIMENTS

Figure 1:
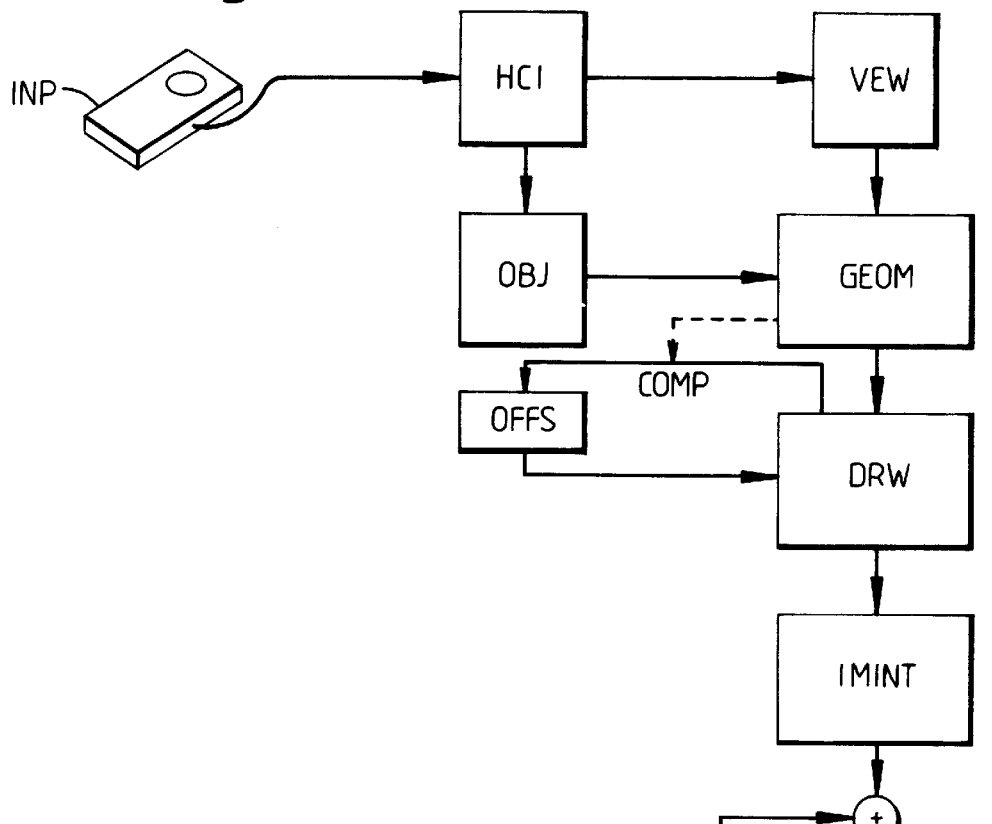
FIG. 1 shows an image synthesis apparatus suitable for putting the invention into effect.

FIG. 1 shows schematically an apparatus for the display of images representing 3-D objects. A database module OBJ stores and manages a database forming a model of a 3-D environment, the "object space", containing various 3-D objects, each modelled as a group of object primitives. Each primitive may for example be a polygonal surface or a curved patch, which in turn is defined by a geometric description (for example vertex coordinates) and a surface description (colour, texture, transparency, surface normal, etc.). Geometric and surface descriptions of light sources may also be included. Another module VEW defines a "viewing space", for example in terms of the position of a viewpoint, the direction of view and the field of view.

User input means INP, such as a track ball, mouse and/or keyboard are connected to a human/computer interface module HCI which allows a user to manipulate or modify objects within the object space or manipulate the viewpoint, direction of view and other attributes of the viewing space.

A geometry module GEOM performs geometric transformations to translate the various object space geometric descriptions of primitives, defined in the database module OBJ, to equivalent descriptions in the viewing space. These transformations will generally include translation, rotation and perspective, as is well-known in the art. The surface descriptions of the primitives are also modified in accordance with lighting conditions in viewing space. In the normal case where the image is only two-dimensional, coordinates in the viewing space in two dimensions (typically called x and y) will correspond linearly to screen coordinates, while a third coordinate (z) corresponds to the "depth" of an object "into" the screen.

The geometry module GEOM passes the viewing space primitive descriptors to a rendering module DRW which converts the viewing space primitive descriptions into a form suitable for display, typically by scan conversion into a 2-D array of pixel values in an image buffer memory IMINT. The rendering module DRW may perform calculations for hidden-surface removal (using the z coordinates) and shading. Suitable means for performing such tasks are well-known in the art.

In accordance with the multiple-rendition technique described by Fuchs et al in the reference cited above, the pixel array in the buffer IMINT is an intermediate, point sampled image. For each image appearing on the display device DIS, a set of N intermediate images are so rendered, and a module OFFS supplies for each of the N renderings a different predetermined offset, so that the sample point for each pixel moves between renderings. An image accumulator buffer IMACC adds together the intermediate images as they are generated so that after N renditions the buffer IMACC contains an image which has been oversampled and filtered in accordance with the sample point distribution and any weightings that may be attached to each sample point.

If successive refinements of the image are to be displayed as soon as they are available, as described by Fuchs et al (for example if the buffer IMACC is not double-buffered), then the values maintained in the buffer IMACC should be normalised so as to form a true running average after each rendition. Otherwise, the intermediate pixel values can simply be added together and divided by N after all renditions to obtain the final average. Division by N can be greatly simplified if N is limited to powers of two (2,4,8,16 etc).

In practice, the offsets may be used to move the primitives relative to a stationary sample point array. For clarity, however, FIG. 2 illustrates the reverse situation where a primitive P, having an edge E and a vertex V, remains stationary over a square array of pixel areas A,B etc., while N=16 different sub-pixel offsets effect point sampling at the points marked with dots within each of the two representative pixel areas A and B.

The sample point arrays shown for pixels A and B are identical and are repeated (not illustrated) in every pixel area of the pixel array, in accordance with a basic sub-pixel array defined by the set of N=16 offsets. It can be seen that in the sub-pixel array in FIG. 2 the sample points are placed at the centres of a square grid of 16 sub-pixels.

Figure 2:
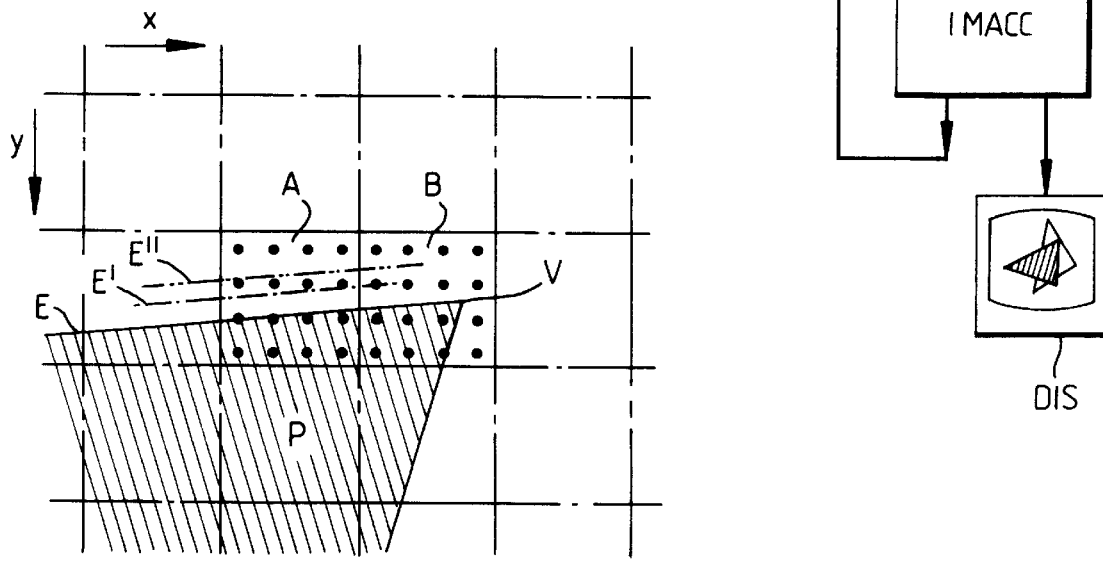
FIG. 2 illustrates the principle of antialias filtering by multiple rendition.

If we assume, for simplicity, that the shaded primitive P has a colour value of 1 and the background has a value of 0, it can be seen from FIG. 2 that the final average value for pixel A will be 7/16 or 8/16, and that for pixel B will be 5/16 or 6/16. These fractions represent the fraction of the pixel area covered by the primitive, quantized in 16ths of a pixel, so that the image in the accumulator buffer IMACC is at least approximately antialias filtered.

Aliasing is a problem which is more apparent on some features of an image than others. In particular, an edge such as the edge E which slopes very slightly with respect to the principal axes x and y of the pixel array tends to generate very visible "staircase" effects. This is particularly disturbing in motion picture image sequences, when the steps of the staircase appear to run at high speed along the edge E as it moves for example to positions E' and E" in successive images.

FIG. 2 shows how the regular grid pattern uses the potential 16 quantisation levels inefficiently, particularly in the case described when aliasing is generally most obtrusive. As the primitive edge E moves to position E', the filtered colour value remains constant at 8/16. Then, in the short space between E' and E", the value jumps four levels to 12/16. In effect, as the relevant edge approaches horizontal (or vertical), the N (=16) quantisation levels potentially available are effectively reduced to only $\sqrt{N}$ (=4) levels, so that twelve of the sixteen renditions are effectively made redundant in the situation where good filtering is most needed. The effort of 16 times oversampling has been expended to yield the benefit of only 4 times oversampling.

FIGS. 3 to 7 show a series of novel sampling arrays, with N=4, 8 or 16 sample points, as indicated. Solid dots represent the basic array of sample points for pixel area A, while open circles represent sample points of neighbouring pixel areas. The novel arrays are arranged so that the edge E of a primitive which is nearly aligned with the x or y axis crosses the sample points one at a time as it moves in the y or x direction respectively, rather than in groups as with the array of FIG. 2.

In particular, the arrays of FIGS. 3, 4, 5 and 7 are such that the pixel area A is divided at exactly N different places in both x and y directions. The 8 points of intersection are marked by arrows along the edges of the pixel area A in FIG. 4. This property can be compared with the array of FIG. 2 in which only $\sqrt{N}$ points of intersection are afforded by N sample points.

The advantage of providing N intersection points is that all N quantisation levels are used to antialias an edge which is near-horizontal, or near-vertical. The sub-pixel array of 16 sample points shown in FIG. 5 is a regular array, with axes ξ and η inclined relative to x and y. This has the consequence that only 4 effective quantisation levels are obtained in the pixel in the special case where an edge is parallel to one of the array axes ξ or η. This may not be a significant problem, since edge aliasing is inherently less obtrusive for sloping edges which slope markedly with respect to the principal axes of the pixel array. It may be noted in this respect that the sample point array of FIG. 5 is not coherent across the pixel boundaries.

It is desirable that the sample points should be distributed widely and evenly across the pixel areas. With this in mind, the basic array in FIG. 3 may appear to give an undesirable diagonal bunching of sample points, top-left to bottom-right. It will be seen however, that a better spread of sample points is in fact provided with the N=4 sample points per pixel when one takes into account the interleaved contributions from pixels in alternate diagonal rows.

FIG. 6 shows an alternative basic array where N=16. This basic array is non-regular, thereby avoiding the special case problem mentioned above. Also, the array of FIG. 6 has a distribution of sample points which is biased to the periphery of the area A, even at the expense of a slightly undersampled region in the centre of the area A. Regions where there is a low sampling density result in poorer antialiasing at primitive vertices, but a good compromise can be reached here, particularly since in a typical image pixels at vertices of primitives are generally much fewer than pixels along edges of primitives. It may be noted that two pairs of sample points coincide in each of x and y, so that there are only fourteen points of intersection in x and y instead of N(=16). This can still be regarded as providing substantially N points of intersection, when compared with the $\sqrt{N}$(=4) points of bisection provided by the array in FIG. 2.

FIG. 7 shows an array with N=8 which attains a wide spread of points over the pixel area A, while providing denser coverage of the central region of the pixel area A, when compared with that of FIG. 4. The criterion that N=8 intersection points should be provided in both x and y is still fully met.

Further variations on these patterns are possible. For example in some embodiments, for example where successive refinements are displayed, it might be advantageous to have a series of basic arrays with N=4, 8, 16 etc. so that each array is a superset of the previous array. Also different weighting coefficients could be attached to the points to achieve more general filtering actions.

Another variation may be termed adaptive multiple rendition, and may be useful where the apparatus of FIG. 1 is generating in real-time motion picture sequences where images are of widely varying complexity, for example in flight simulation applications. For this purpose, the module OFFS in FIG. 1 receives a complexity signal COMP for each image and modifies the number N of renditions so as to maintain the best image filtering (for example for antialiasing) which is consistent with a desired image update rate. The complexity signal COMP should represent the amount of time taken for the rendering module DRW to make each rendition. The signal COMP may for example be obtained by direct feedback from the module DRW of the time taken for the first rendition. That is, if less than 50% of the time available is used for the first rendition, then another rendition can be made. This can further be generalised to determine the number of renditions which can be made given the total time available and the time taken per rendition, that is the number of renditions available is equal to the total time available divided by the time per rendition. Alternatively, it may be supplied by the geometry module GEOM, if that module contains means for estimating rendering time, for example by totalling the screen areas of all primitives in the image or a prediction of image complexity could be made based on time taken to render the previous image in the motion picture sequence, possibly supplemented with a complexity-change signal from the geometry module GEOM.

Various special effects are attainable by dividing the N offsets defining the basic array of sample points into two or more subsets. For this purpose, subsets of points can be chosen so that each sub-array meets to some extent the criteria for good filtering as set forth above in relation to the whole array. Two such subsets are distinguished in FIG. 6 by means of crosses superimposed on a first subset of eight of the sixteen sample points in the basic array.

One effect that can be achieved by use of subsets is tonal mixing. For example, by rendering the first subset of sample points in accordance with the tonal description of a foreground primitive, and the second subset in accordance with that of a background primitive, translucency of the foreground primitive is simulated, while antialias filtering is still effected at the edges of the foreground primitive with a resolution of N/2=8 quantisation levels.

Another application of tonal mixing by multiple rendition is the mixing of textures from two different texture maps. For example a fine, repetitive texture in luminance could be blended with a broader colour texture by rendering the first subset using one texture map and the second subset using another. In this context, "texture mapping" is to be taken as including a whole family of applications of mapping, a number of which are described for example by Paul S. Heckbert in his paper "A Survey of Texture Mapping", in IEEE Computer Graphics and Applications, November 1986 at pages 56 to 67.

For the purpose of such techniques, the sample points in FIG. 6 have been ordered in accordance with the numbers 1 to 16 marked in the Figure. The ordering groups together the first subset as numbers 1 to 8 and the second subset as numbers 9 to 16. When the module OFFS supplies the offsets in the corresponding order, the rendering module DRW need switch only once between the two sources of the two tonal descriptions which are being combined, which may save time in some embodiments.

Ordering the renditions as shown also has advantages when successive refinement is being implemented on-screen using the whole array without blending, since the order illustrated is such that a wide and even spread of sample points is obtained after only a few renditions, so that each successively refined image will be optimally filtered. When subsets of the renditions are used for tonal mixing in a successive refinement embodiment, it may be advantageous for the rendition sequence to be such that the members of the subsets are dispersed and interleaved in the sequence, thereby avoiding dramatic changes in the image's appearance as the successive renditions are added into the running average in the accumulator buffer IMACC.

Another effect that can be obtained by multiple rendition is that of motion blur. By updating the object and view databases (modules OBJ and VEW) between renditions, to simulate motion of the object and the viewer in a period which is 1/N times an image period, the different samples are effectively spread in time as well as space, and fast moving objects will appear smeared out over an area of the image which corresponds to the distance moved by the primitive during the said image period. For this effect, correct ordering of the renditions is also important, again so as to achieve a wide and even spread of sample points as the array builds up. There is a trade-off so that filtering quality is lost for fast moving primitives, while full filtering is maintained for slow or stationary primitives. Those skilled in the art will recognize that this trade-off is entirely appropriate in a motion picture sequence, since the human eye is not sensitive to detail on fast-moving objects.

From reading the present disclosure, further or alternative variations and combinations will be apparent to persons skilled in the art. Such variations may involve other features which are already known in the design, manufacture and use of image generating methods and apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of generating, from primitive data comprising geometric and surface descriptions of a plurality of image primitives, an image of objects in a three dimensional space constituted by a regular, two dimensional filtered pixel array having two principal axes, the method comprising:

using the primitive data to form N renditions comprising respective N intermediate pixel arrays obtained by imposing respective N different offsets between the primitives and a sample point for each pixel of said filtered pixel array, said N different offsets defining a basic array of N sample points distributed substantially over the area of a pixel of said filtered pixel array, which basic array of N sample points is applicable to each pixel of said filtered pixel array; and combining the N intermediate pixel arrays to generate said filtered pixel array constituting an image which has been oversampled and filtered; wherein the N offsets are obtained by:

selecting a class of image feature for filtering; and determining the locations of the N sample points of the basic array in dependence upon the selected class of image feature so as to ensure substantially N times oversampling of the selected class of image feature;

wherein the selected class of image feature comprises edges, which are nearly aligned with one or the other of the principal axes of the filtered pixel array, the locations of the N sample points in the basic array being chosen so as to divide the area of a pixel of the filtered pixel array at substantially N places in the direction of at least one of the principal axes of the filtered pixel array.

2. A method as claimed in claim 1, wherein the basic array of N sample points is a regular array having two principal axes which are not aligned with either of the principal axes of the filtered pixel array.

3. A method as claimed in claim 1, wherein a distribution of the locations of the N sample points in the basic array is chosen to have a bias toward the periphery of the area of a pixel.

4. A method as claimed in claim 1, in which different types of surface information are combined in the generated image by using each type of surface information for a different subset of the renditions.

5. A method as claimed in claim 4, wherein different subsets of the renditions are performed using surface information relating to different primitives.

6. A method as claimed in claim 4, wherein different subsets of the renditions are performed using surface information from different texture maps.

7. A method as claimed in claim 4, wherein the renditions are ordered so as to group together members of each of the said subsets.

8. A method as claimed in claim 4, wherein the renditions are ordered so as to disperse and interleave members of the said subsets.

9. A method as claimed in claim 1, in which the image is part of a motion picture sequence of images generated in real time, the value of N being chosen adaptively in response to changes in the time required for each rendition so as to maximise N while maintaining a predetermined minimum image rate.

10. A method as claimed in claim 2, wherein a distribution of the locations of the N sample points in the basic array is chosen to have a bias toward the periphery of the area of a pixel.

11. A method as claimed in claim 10, in which different types of surface information are combined in the image by using each type of surface information for a different subset of the renditions.

12. A method as claimed in claim 11, wherein different subsets of the renditions are performed using surface information relating to different primitives.

13. A method of generating an image in a two-dimensional array of pixels by combining a plurality of predefined image primitives for mapping onto the pixels, the method comprising antialias filtering based on an oversampling of each pixel, wherein the filtering comprises:

selecting a particular one of the pixels and determining which specific one or more of the primitives is to be mapped in the foreground on the particular pixel; and carrying out the oversampling in dependence upon edge orientation of the specific one or more primitives.

\* \* \* \* \*